United States Patent [19]

Charbonnier et al.

[11] 3,773,558
[45] Nov. 20, 1973

[54] ELECTRIC ACCUMULATOR WITH BETA ALUMINA SEPARATOR AND ELECTROLYTE CONSISTING OF A SALT IN AN ORGANIC SOLVENT

[75] Inventors: Jean-Claude Charbonnier, Saint Germain-en Laye, France; Helmut Tannenberger, Geneva, Switzerland

[73] Assignee: Battelle Memorial Institute, Carouge/Geneve, Switzerland

[22] Filed: Mar. 8, 1972

[21] Appl. No.: 232,798

Related U.S. Application Data

[63] Continuation-in-part of Ser. No. 79,204, Oct. 8, 1970.

[30] Foreign Application Priority Data

Mar. 9, 1971   Switzerland.......................... 3400/71

[52] U.S. Cl............ 136/6 LN, 136/100 R, 136/146, 136/154
[51] Int. Cl. ......................................... H01m 35/02
[58] Field of Search.................. 136/6 R, 6 L, 6 LN, 136/83, 100 R, 146, 154, 155

[56] References Cited
UNITED STATES PATENTS

| | | |
|---|---|---|
| 3,537,328 | 9/1970 | Bro et al. .......................... 136/100 R |
| 3,110,630 | 11/1963 | Wolfe, Jr. ................. 136/6 |
| 3,535,163 | 10/1970 | Dzieciuch et al. ....................... 136/6 |
| 3,446,668 | 5/1969 | Arrance et al. ..................... 136/146 |
| 3,484,296 | 12/1969 | Buzzelli............................ 136/100 R |
| 3,681,144 | 8/1972 | Dey et al............................ 136/83 R |

Primary Examiner—A. B. Curtis
Assistant Examiner—C. F. Lefevour
Attorney—Karl F. Ross

[57]   ABSTRACT

The housing of an accumulator cell is divided into an anode compartment and a cathode compartment by a fluidtight separator of beta alumina permselective to ions from an anode which includes a solid phase of alkali or alkaline-earth metal (e.g., sodium) in a liquid phase of an alloy thereof having a solid-liquid boundary at an operating temperature up to about 100° C. The cathode compartment contains an electrolyte in the form of a solution of a salt of the solid anode metal in a polar organic solvent, capable of dissolving a virtual reaction product formed during the discharge of the accumulator, together with a cathode in the shape of an electronically conductive sintered structure incorporating a cathodically reducible metal compound such as a fluoride of a transition metal.

16 Claims, 1 Drawing Figure

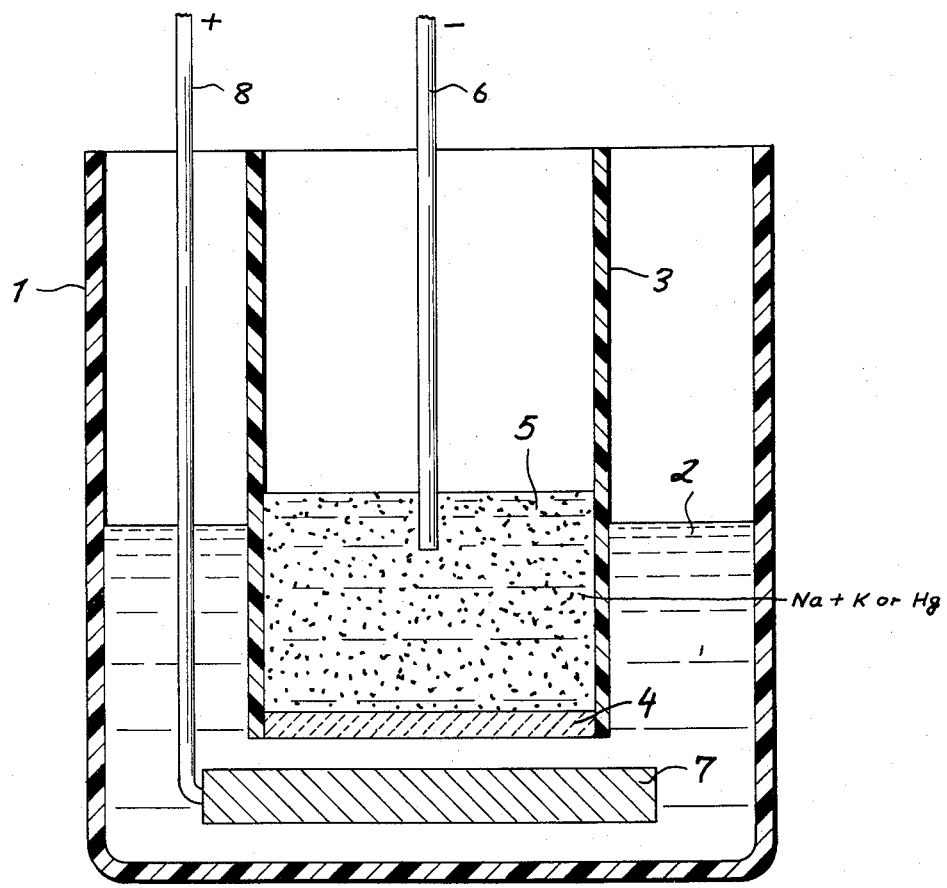

ELECTRIC ACCUMULATOR WITH BETA ALUMINA SEPARATOR AND ELECTROLYTE CONSISTING OF A SALT IN AN ORGANIC SOLVENT

This application is a continuation-in-part of our co-pending application Ser. No. 79,204 filed Oct. 8, 1970.

Our present invention relates to an electric accumulator or storage battery of the type wherein the housing of a battery cell is subdivided into an anode compartment and a cathode compartment by a solid, fluid-impenetrable separator which is permeable to the ions of a metallic constituent of the associated anode.

Such a permselective separator generally consists of a ceramic material, specifically a beta alumina, e. g., as described in U.S. Pat. Nos. 3,458,356 and 3,535,163. In prior systems incorporating such separators, however, the accumulator had to be operated at very high temperatures (upward of about 300° C) to generate the necessary ion flow between the anode and cathode materials contacting the separator from opposite sides.

As disclosed in our above-identified copending application, an accumulator of this general type operable at ambient temperatures can be realized by immersing the solid cathode, whose sintered and electrically conductive structure incorporates a cathodically reducible metal compound, in a non-aqueous electrolyte consisting essentially of a solution of a salt of the anode material in an organic solvent capable of dissolving a reaction product composed of cations of the anode metal and anions of the reducible cathode compound. This reaction product may be characterized as virtual since, at least in the initial discharge stage, it is present only in the form of its cations and anions.

As further described in our copending application, the active anode material may be an alkali metal such as lithium, sodium, potassium or rubidium, an alkaline-earth metal such as calcium, strontium or barium, or lanthanum; sodium in particular, stands out as the preferred constituent. The reducible cathode compound, serving as an electron acceptor, may be a halide, an oxide or a sulfide of a transition metal such as iron, nickel, cobalt, chromium, copper or vanadium, though a mercury or a silver salt could also be used. Particularly preferred are the transition-metal fluorides such as $FeF_2$, $FeF_3$, $CuF_2$, $NiF_2$ and $CoF_3$. The beta alumina used for the separator may have the following compositions: $Na_2O \cdot 11Al_2O_3$, $K_2O \cdot 11Al_2O_3$, $Rb_2O \cdot 11Al_2O_3$, $Cs_2O \cdot 11Al_2O_3$, $Li_2O \cdot 11Al_2O_3$, $CaO \cdot 6Al_2O_3$ and $La_2O_3 \cdot 11Al_2O_3$. Especially with sodium as the active anode metal, the preferred composition is $Na_2O \cdot 11Al_2O_3$. Suitable solvents include dimethylformamide, N,N'-dimethylacetamide, N-methylacetamide, gamma-butyrolactone, tetrahydrofurane or propylene carbonate. The sintered cathode structure may have distributed therethrough an ancillary conductor which preferably is a material corresponding to the metallic component of the reducible metallic compound, e. g., nickel.

In a system of this character, the migration of cations through the separator at ambient temperatures can be facilitated by the interposition of an electrolytic body between the anode and the separator, this body consisting essentially of a solution of the aforementioned salt of the anode material in an organic solvent which may or may not be the same as that of the electrolyte in the cathode compartment. Though the accumulator could also operate without such an electrolytic body, its presence considerably increases the available output.

The general object of our present invention is to provide an improved accumulator of this description which has a low internal resistance, at operating temperatures well below those of the prior systems referred to above, without the use of such an organic electrolyte on the anode side.

A more particular object is to provide means for effectively protecting the anode material from oxidation or the corrosive effect of moisture, thereby obviating the need for a hermetic enclosure.

In accordance with this invention, the anode of our improved accumulator consists essentially of a composition of at least two metals having a solid/liquid boundary at a relatively low operating temperature not more than about 100°C, the metallic constituents forming the solid phase at that operating temperature being one of the aforementined alkali or alkaline-earth metals (preferably sodium).

In such a system, the liquid phase supplies mobile cations to the permselective separator with continuous replenishment of the active constituent from the solid phase going into solution therein.

Such a composition may generally be formed from two or more metals chosen from Groups IA, IIA, IIB and IIIB of the Periodic Table. Particularly suitable is an alloy of sodium and potassium, with the latter present in a proportion ranging between about 40 percent and 70 percent by weight of the mixture, and a sodium amalgam which is especially effective in protecting the active material (sodium) from oxidation or corrosion.

The sole FIGURE of the accompanying drawing illustrates, in vertical section, an embodiment of an electric accumulator according to our invention.

The accumulator cell shown in the drawing comprises a glass receptacle 1 containing a saturated solution 2 of sodium chloride in dimethylformamide. A glass receptacle 3, smaller than the receptacle 1, is mounted inside the latter and partly dips into the solution 2. The lower end of the receptacle 3 is closed off by a plate 4 of sodium beta alumina, acting as a cation-permeable ceramic separator, and by a glass seal not shown. The receptacles 1 and 3 are filled with an atmosphere of inert gas, here pure argon. The receptacle 3 contains an anode 5 of the aforedescribed type consisting partly of sodium in the solid state.

A conductor 6, which consists of a platinum wire and which is in contact with the anode, serves to connect the accumulator to an external load circuit, not shown. The cathode 7 of the accumulator is a flat disk of porous structure produced by sintering a mixture of nickel fluoride $NiF_2$ and metallic nickel, containing 34 percent by weight of $NiF_2$. This disk is placed in the solution 2, in confronting relationship with the plate 4, at a distance of 1 mm from the latter. The cathode 7 is connected to the load circuit by means of a conductor 8 constituted by a nickel wire.

The plate 4 of beta alumina can be produced, for instance, by simultaneous sintering and chemical reaction from pure alpha alumina and powered sodium carbonate blended in suitable proportions to achieve an approximate final molar ratio of 11:1 of alumina and sodium oxide (approximate final composition: $Na_2O \cdot 11Al_2O_3$). The two powders are intimately mixed in a ball grinder and the mixture is compacted with an isostatic press at a pressure of 25 metric tons per square centimeter in the form of a "carrot" of approximately cylindrical shape which is sintered for 4 hours in an oxidizing atmosphere at 1570°C. After sintering, the plate 4 is cut out of the carrot in the form of a flat disk of the required size, here with a diameter of 1 cm and a thickness of 1 mm.

The above-described accumulator operates at a temperature between ambient and about 100°C as follows:

During discharge of the accumulator, the sodium of the anode is ionized in the liquid phase, giving off one electron for each sodium ion formed. The electrons thus released are fed to the load circuit via the conductor 6. The sodium ions traverse the separator 4 and then pass into the organic solution 2. At the cathode 7, the nickel fluoride is decomposed into its elements, accepting in so doing two electrons per NiF$_2$ molecule, which formation of metallic nickel which remains in the porous structure of the cathode 7 and F$^-$ions which pass into the solution 2. The number of F$^-$ions being formed is equal to that of the Na$^+$ions passing into the solution 2. The overall chemical reaction is thus given by the following relationship:

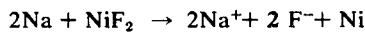

$$2Na + NiF_2 \rightarrow 2Na^+ + 2F^- + Ni$$

and is the sum of the following two electrochemical reactions which respectively take place at the anode and at the cathode:

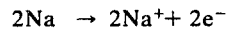
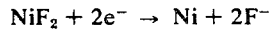

$$2Na \rightarrow 2Na^+ + 2e^-$$
$$NiF_2 + 2e^- \rightarrow Ni + 2F^-$$

The electrons are returned from the load circuit to the cathode 7 by the conductor 8.

Thus, as the accumulator discharges, the sodium contained in the receptacle 3 is depleted, as is the nickel fluoride of the cathode, whereas metallic nickel forms at the cathode and the solution 2 becomes enriched with the anions and cations of the virtual reaction product, i. e., sodium fluoride.

The recharging of the accumulator is done by causing electric current to pass into the accumulator with a polarity supplying electrons to the anode 5 and removing electrons from the cathode 7, with the aid of an electric current source whose negative terminal is connected to the anode 5 and whose positive terminal is connected to the cathode 7. During charging, the aforedescribed reactions are reversed so that, at the cathode, the nickel is transformed into nickel fluoride, the solution 2 is depleted of sodium fluoride and metallic sodium forms in the receptacle 3.

As long as solid sodium is present in anode compartment 3, the proportions of the constituents of the liquid phase will remain substantially constant as fresh sodium goes into solution to replace the departed ions.

EXAMPLE I

Anode 5 is a sodium/potassium alloy consisting of equal parts, by weight, of Na and K. With an operating temperature of 30°C, about two-thirds of the sodium content goes into the liquid phases as eutectic with the available potassium.

EXAMPLE II

Mercury is heated to 200° C and admixed with 15 percent sodium by weight. About two-thirds of the sodium amalgamates with the mercury at an operating temperature of 50°C, the remainder constituting the solid phase.

If the active anode and cathode materials are present in other than stoichiometric proportions, the storage capacity of the cell is determined by the quantity of the less abundant material.

We claim:

1. An electric accumulator comprising:
   a container divided into a first compartment and a second compartment;
   an anode in said first compartment consisting essentially of a composition of at least two metals having a solid/liquid boundary at an operating temperature up to about 100°C, the metallic constituent forming the solid phase at said operating temperature being an alkali metal or an alkaline-earth metal;
   a solid cathode in said second compartment having a sintered electronically conductive structure incorporating a cathodically reducible metal compound;
   a solid fluid-impenetrable separator consisting of beta alumina permeable to the ions of said metallic constituent between said compartments;
   an electrolyte in said second compartment consisting essentially of a solution of a salt of the metal of said constituent in an organic solvent capable of dissolving a reaction product composed of cations of said constituent and anions of said reducible compound, said cathode being immersed in said electrolyte in spaced relationship with said separator; and
   a conductive load circuit connected across said anode and cathode.

2. An accumulator as defined in claim 1 wherein said composition is an alloy with a eutectic melting below said operating temperature.

3. An accumulator as defined in claim 1 wherein said composition is an amalgam.

4. An accumulator as defined in claim 1 wherein said composition is an alloy of elements taken from any of Groups IA, IIA, IIB and IIIB of the Periodic Table.

5. An accumulator as defined in claim 4 wherein said metallic constituent is lithium, sodium, potassium, rubidium, calcium, strontium or barium.

6. An accumulator as defined in claim 5 wherein said composition is a mixture of sodium and mercury.

7. An accumulator as defined in claim 5 wherein said composition is a mixture of sodium and potassuim, with the potassium present in a proportion ranging substantially between 40 percent and 90 percent by weight of the mixture.

8. An accumulator as defined in claim 1 wherein said beta alumina has substantially the composition Na$_2$O·11Al$_2$O$_3$, said metallic constituent being sodium.

9. An accumulator as defined in claim 1 wherein said reducible metal compound is a halide, an oxide or a sulfide of a transition metal, silver or mercury.

10. An accumulator as defined in claim 1 wherein said reducible metal compound is a fluoride.

11. An accumulator as defined in claim 10 wherein said fluorid is FeF$_2$, FeF$_3$, CuF$_2$, NiF$_2$ or CoF$_3$.

12. An accumulator as defined in claim 1 wherein the salt dissolved in said electrolyte is a chloride, a perchlorite or a hexafluorophosphate.

13. An accumulator as defined in claim 12 wherein said salt is sodium chloride in saturating concentration.

14. An accumulator as defined in claim 1 wherein said solvent is dimethylformamide, N,N'- dimethylacetamide, N-methylacetamide, gamma-butyrolactone, tetrahydrofurane or propylene carbonate.

15. An accumulator as defined in claim 1 wherein said cathode includes an ancillary conductory distributed through-out said structure.

16. An accumulator as defined in claim 15 wherein said ancillary conductor is a metal corresponding to the metallic component of said reducible metal compound.

* * * * *

Dedication 3,773,558.—*Jean-Claude Charbonnier*, Saint Germain-en Laye, France and *Helmut Tannenberger*, Geneva, Switzerland. ELECTRIC ACCUMULATOR WITH BETA ALUMINA SEPARATOR AND ELECTROLYTE CONSISTING OF A SALT IN AN ORGANIC SOLVENT. Patent dated Nov. 20, 1973. Dedication filed Mar. 26, 1984, by the assignee, *Battelle Memorial Institute*.

Hereby dedicates to the People of the United States the entire remaining term of said patent.

[*Official Gazette May 29, 1984.*]